(12) United States Patent
Aguirre et al.

(10) Patent No.: US 8,521,141 B2
(45) Date of Patent: Aug. 27, 2013

(54) OPTIMIZING DELIVERY OF STREAMS

(75) Inventors: Sergio Aguirre, Southlake, TX (US); Lalit Ratilal Kotecha, San Ramon, CA (US); Derek H. Bao, Concord, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 137 days.

(21) Appl. No.: 13/235,895

(22) Filed: Sep. 19, 2011

(65) Prior Publication Data

US 2013/0072167 A1 Mar. 21, 2013

(51) Int. Cl.
*H04M 3/42* (2006.01)
*H04W 72/00* (2009.01)

(52) U.S. Cl.
USPC .................................... 455/414.1; 455/452.2

(58) Field of Classification Search
USPC ................... 455/414.1–414.3, 466, 418–420, 455/412.1–412.2, 451, 450, 452.1–452.2; 370/328, 338

See application file for complete search history.

(56) References Cited

U.S. PATENT DOCUMENTS

| | | | | |
|---|---|---|---|---|
| 8,023,957 | B2 * | 9/2011 | Weigand | 455/452.1 |
| 8,045,557 | B1 * | 10/2011 | Sun et al. | 370/390 |
| 8,351,453 | B2 * | 1/2013 | Park et al. | 370/431 |
| 2008/0040757 | A1 * | 2/2008 | Romano et al. | 725/81 |
| 2011/0058473 | A1 * | 3/2011 | Krym et al. | 370/232 |
| 2011/0228677 | A1 * | 9/2011 | Weigand | 370/237 |

* cited by examiner

*Primary Examiner* — Brandon Miller

(57) ABSTRACT

A device receives, from one or more base stations, first information about bandwidth resources of the one or more base stations. The device further receives, from one or more content providers, second information about streams of content provided by the one or more content providers to user devices via the one or more base stations. The device generates third information based on the first information and the second information. The third information assigns a portion of the bandwidth resources to each one of the streams. The device transmits the third information to configure the one or more base stations.

20 Claims, 5 Drawing Sheets

| SCHEDULE ID 405 | | TIME 410 | BASE STATION ID 415 | |
|---|---|---|---|---|
| STREAM ID 420 | STREAM TYPE 425 | FREQUENCY BAND 430 | BANDWIDTH 435 | |
| LIVEVID1 | DS | BAND 2 | BW1 | 432 |
| RECVID1 | DT | BAND 1 | BW2 | 434 |
| RECVID2 | DT | BAND 2 | BW3 | 436 |
| STATS1 | DI | BAND 2 | BW4 | 438 |
| ... | ... | ... | ... | |

OPTIMIZING DELIVERY OF STREAMS

BACKGROUND

User devices, of subscribers of a carrier network, receive streams (e.g., video streams) from content providers via base stations of the carrier network. Base stations may transmit multiple streams simultaneously. Each one the multiple streams may have different delay requirements. For example, one stream can include live video content that has a stringent delay requirement (e.g., allows less than 1 second of delay), while another stream can include previously recorded content that has a relatively tolerant delay requirement (e.g., allows less than 2 seconds of delay). However, currently, base stations do not differentiate between streams with different delay requirements and use similar bandwidth resources to deliver the streams. As a result, if a carrier wants to ensure that the stringent delay requirement is met for any stream that requires it, the carrier needs to provide enough resources (e.g., bandwidth via base stations) to accommodate the stringent delay requirement for all data streams. Otherwise, the stringent delay requirement is not met for the stream that requires it, and the quality of the stream's delivery suffers.

BRIEF DESCRIPTION OF THE DRAWINGS

FIG. 4 is a diagram of an example data structure that stores configuration information used to optimize delivery of streams.

DETAILED DESCRIPTION OF PREFERRED EMBODIMENTS

Figure 1:
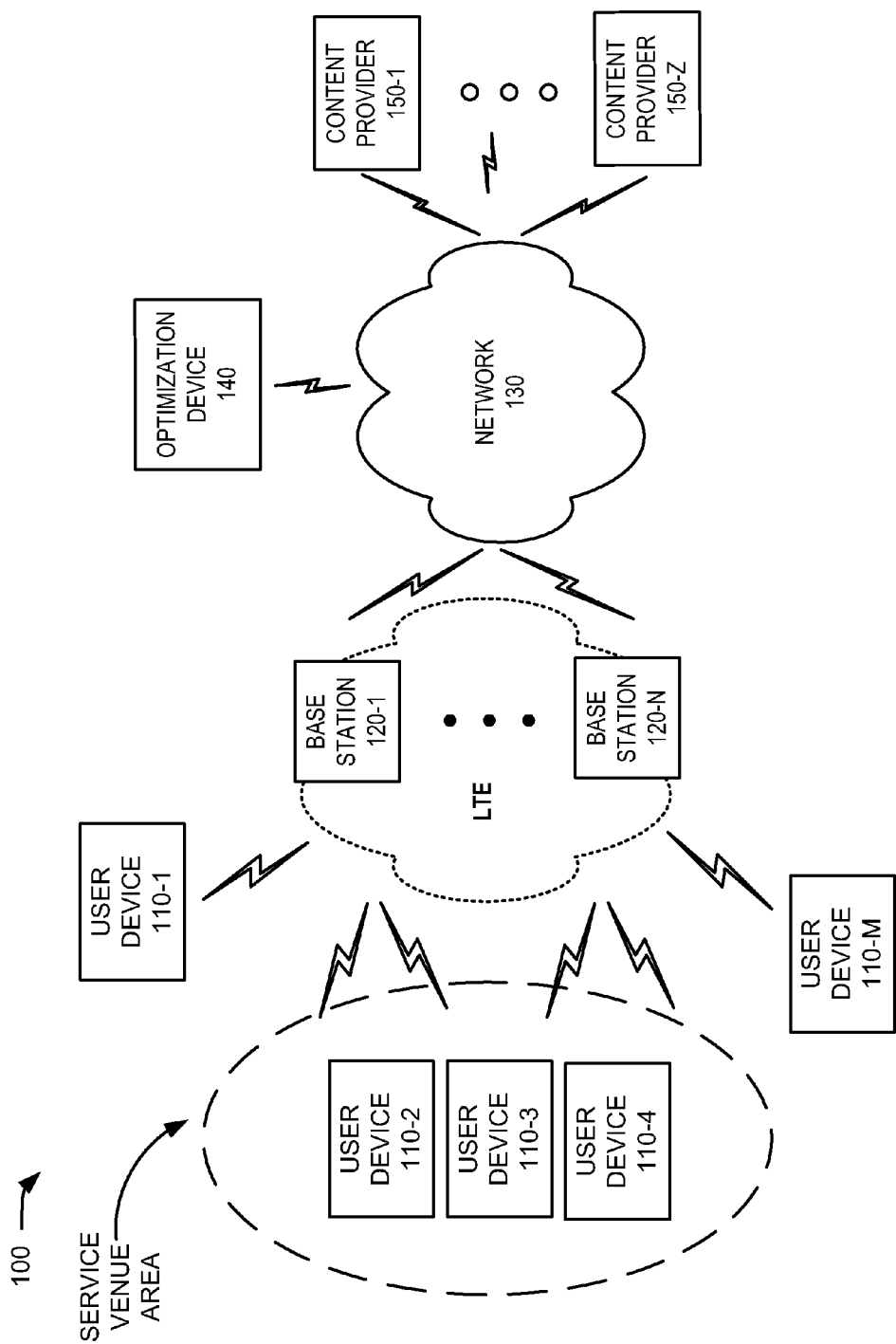
FIG. 1 is a diagram of an example environment in which systems and/or methods described herein may be implemented.

The following detailed description refers to the accompanying drawings. The same reference numbers in different drawings may identify the same or similar elements.

A carrier may refer to one or more of a mobile network operator (MNO), a mobile telephone operator, a carrier service provider (CSP), a wireless service provider, a wireless carrier, a cellular company, an Internet service provider (ISP), and/or any other company that provides data and/or broadcast services (e.g., delivery of data streams) to users (e.g., subscribers of the carrier) via a network. A carrier may also refer to a carrier network provided and operated by the carrier.

A stream may refer to a stream of content that includes video content (e.g., a video stream), audio content (e.g., an audio stream), and/or textual content (e.g., a textual stream). A stream may refer to content that is provided from a content provider to a user device via base stations of a carrier. Streams may be delivered from a content provider to a user device by using evolved multimedia broadcast multicast services (eMBMS).

Each stream may be associated with a different category of delay requirement based on a type of the content. For example, the stream may be associated with a delay-sensitive category when the content is live video content, the stream may be associated with a delay-tolerant category when the content is previously recorded content; and the stream may be associated with a delay-insensitive category when the content is data content (e.g., web page data, statistics associated with games and/or players, etc.). The delay-sensitive category may allow a delay that is less than a first particular period of time (e.g., 1 seconds), the delay-tolerant category may allow a delay that is less than a second particular period of time (e.g., 2 seconds), and the delay-insensitive category may allow a delay that is less than a third particular period of time (e.g., 10 seconds), where the first particular period of time is less than the second particular period of time and where the second particular period of time is less than the third particular period of time. eMBMs services may allow a device to identify different types of streams, and, for example, to select a lightly loaded carrier for a stream associated with a delay-sensitive category.

An implementation, described herein, may allow a carrier to optimize delivery of streams to user devices, via base stations of the carrier, by allocating different amounts of bandwidth resources based on different delay requirements of the streams. For example, a device of a carrier may receive traffic load information from base stations of the carrier. The device may determine an amount of bandwidth that can be handled by the base stations based on the traffic load information. The device may further receive, from content providers, information about different streams that will be transmitted from the content providers to user devices within a particular period of time. The device may determine delay requirements for each of the streams based on the information about the streams. The device may determine configurations of the base stations for delivery of the streams during the particular period of time. The base stations may be configured, and deliver the streams, based on the configurations.

FIG. 1 is a diagram of an example environment 100 in which systems and/or methods described herein may be implemented. As shown in FIG. 1, environment 100 may include multiple user devices 110-1, . . . , 110-M (where M≧1) (hereinafter referred to collectively as "user devices 110" and individually as "user device 110"); multiple base stations 120-1, . . . , 120-N (where N≧1) (hereinafter referred to collectively as "base stations 120" and individually as "base station 120"); a network 130; an optimization device 140; and multiple content providers 150-1, . . . , 150-Z (where Z≧1) (hereinafter referred to collectively as "content providers 150" and individually as "content provider 150"). The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a LTE network and/or an evolved packet core (EPC) that operate based on a third generation partnership project (3GPP) wireless communication standards. The LTE network may be a radio access network (RAN) that includes one or more base stations 120 that take the form of evolved Node Bs (eNBs) via which user devices 110 communicate with the EPC. Alternatively, the implementations may be performed within a RAN that is not based on a LTE network.

User device 110 may include any computation or communication device, such as a wireless mobile communication device that is capable of communicating with base station 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from content provider 150 via base station 120 and/or network 130.

As shown in FIG. 1, user device 110 may be located inside or outside of a service venue area. Examples of a service venue area may include a stadium, an arena, a golf course, a race track, an amusement park, a shopping center, or one or more other types of geographical areas where live video content may be provided as streams to multiple user devices 110 within the service venue area. In one example, a service venue area may be a football stadium where the live content is broadcasted over a radio frequency bandwidth that is dedicated to broadcasting the live content to user devices 110.

User device 110 may receive a guide that specifies different streams that are provided from one or more content providers 150. A user, of user device 110, may select one or more of the streams (e.g., 10 streams) from the guide. User device 110 may transmit request(s) to receive the selected streams. Content providers 150 may provide the selected streams to user device 110, via base station(s) 120, in response to the request(s).

Base station 120 may include one or more devices that receive, process, and/or transmit traffic, such as audio, video, text, and/or other data, destined for and/or received from user device 110. In an example implementation, base station 120 may be an eNB associated with the LTE network that receives streams of traffic (e.g., video or data streams) from content providers 150 via network 130. Base station 120 may forward the streams of traffic to user devices 110 via an air interface. One or more of base stations 120 may be associated with a RAN. The RAN may be associated with the LTE network. In another example, one or more other base stations 120 may be associated with a RAN that is not associated with the LTE network.

Base station 120 may transmit information associated with traffic load conditions (e.g., hereinafter referred to as "traffic load information") to optimization device 140. Traffic load information may identify a quantity of bandwidth being processed by base station 120, a quantity of bandwidth that is available relative to a bandwidth capacity of base station 120 (e.g., a maximum quantity of bandwidth that can be processed, by base station 120, relative to each carrier band, channel, etc.), and/or a quantity of applications and/or services being provisioned via base station 120. The traffic load information may also identify a type of content being provisioned (e.g., unicast, multicast, broadcast, video, voice, text, etc.) via base station 120, a quantity of user devices 110 being serviced by base station 120, etc.

Base station 120 may receive configuration information that identifies bandwidth resources (e.g., frequency bands, quantities of bandwidth, resource blocks, etc.), and/or time resources (e.g., periods of time, quantity of subframes, etc.) that are allocated to provide different streams to user devices 110 being serviced by base station 120. The bandwidth resources may correspond to amounts of bandwidth (e.g., quantities of resource blocks) that identify a quantity of bits of traffic and/or a quantity of packets, within a period of time, that are permitted to be used, by base station 120, to provide the streams. The time resources may correspond to periods of time (e.g., quantities of subframes) that are permitted to be used, by base station 120, to provide the different streams.

A different amount of the bandwidth resources and/or the time resources may be allocated/assigned for each one of the different streams. Base stations 120 may use the configuration information to transmit the streams by using different amounts of bandwidth resources and/or time resources in order to comply with the different delay requirements that correspond to the streams.

Additionally, or alternatively, the configuration information may include information that identifies a modulation and coding scheme (MCS) (e.g., based on a MCS index) to be used to provide the streams. The MCS index may include a value that corresponds to a type of modulation (e.g., binary phase-shift keying (BPSK), quadrature phase-shift keying (QPSK), quadrature amplitude modulation (QAM), etc.), a data rate, a channel bandwidth, etc. to be used to provision the applications and/or services.

Network 130 may include one or more wired and/or wireless networks. For example, network 130 may include a cellular network, a public land mobile network (PLMN), a second generation (2G) network, a third generation (3G) network, a fourth generation (4G) network, a fifth generation (5G) network, and/or another network. Additionally, or alternatively, network 130 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Network 130 may include one or more network devices (not shown in FIG. 1). For example, network 130 may include a serving gateway. The serving gateway may include one or more data processing and/or traffic transfer devices or network devices, such as a gateway, a router, a modem, a switch, a firewall, a network interface card (NIC), a hub, a bridge, a proxy server, an optical add-drop multiplexer (OADM), or some other type of device that processes and/or transfers traffic. The serving gateway may, for example, aggregate traffic received from one or more base stations 120 and may send the aggregated traffic via network 130. The serving gateway may also receive traffic via network 130 and may send the received traffic to user devices 110 via base stations 120. The serving gateway may further perform handoff operations between base stations 120 via which user devices 110 are communicating.

Optimization device 140 may include one or more devices, and/or other types of computation or communication devices, that gather, process, search, store, and/or provide information in a manner described herein. In one implementation, optimization device 140 may include a computer device (e.g., a server) that is separate from the LTE network and/or network 130. In another implementation, optimization device 140 may be a network component (e.g., a network device) of the LTE network and/or network 130.

Optimization device 140 may receive traffic load information, from base stations 120, and stream information, from content providers 150. The traffic load information may include information associated with available bandwidth resources of base stations 120. The stream information may include information about a particular quantity of streams (e.g., 3 streams, such as stream 1, stream 2, and stream 3) that are to be transmitted from one or more content providers 150 to user devices 110 via one or more base stations 120. The stream information may include, for example, data rates associated with each stream (e.g., 500 Kbps for stream 1, 800 Kbps for stream 2, 500 Kbps for stream 3), a type of encoding required for each stream (e.g., live encoding for stream 1, live encoding for stream 2, non-real time encoding for stream 3), a delay requirement of each stream (e.g., 1 second for stream 1, 2 seconds for stream 2, 3 seconds for stream 3), and/or other information associated with the streams, as described further below.

Optimization device 140 may further identify an allocation/division of resources of base station(s) 120 between eMBMS (e.g., the transmission of video streams from content providers 150 to user device 110) and/or other types of services (e.g., unicast services, including, for example, Voice over LTE (VoLTE) services, email services, best effort data services, etc.). The allocation/division of resources may specify a particular percentage (e.g., 20%) for the broadcasting services and a particular percentage (e.g., 80%) for the other services.

Optimization device 140 may generate configuration information based on the traffic load information, the stream information, and/or the identified allocation/division of the bandwidth resources of base stations 120. In one implementation, an operator of base stations 120 (e.g., the carrier) may configure parameters of base stations 120 based on the configuration information. In another implementation, optimization device 140 may transmit the configuration information to base stations 120 and base stations 120 may configure themselves. Base stations 120 may transmit the different streams based on the configuration information.

Content provider 150 may include any type or form of content provider. For example, content provider 150 may include free television broadcast providers (e.g., local broadcast providers, such as NBC, CBS, ABC, and/or FOX), for-pay television broadcast providers (e.g., TNT, ESPN, HBO, CNN, etc.), and/or Internet-based content providers that stream content from web sites and/or permit content to be downloaded (e.g., via progressive download, etc.). Content provider 150 may include on-demand content providers (e.g., video on demand (VOD), pay per view (PPV), etc.).

Content provider 150 may represent one or more computer devices (e.g., servers) of a particular content provider. Content provider 150 may provide stream information about different streams, which are provided by content provider 150, to optimization device 140. Content provider 150 may provide the different streams to user devices 110, via base stations 120, after providing the stream information.

Figure 2:
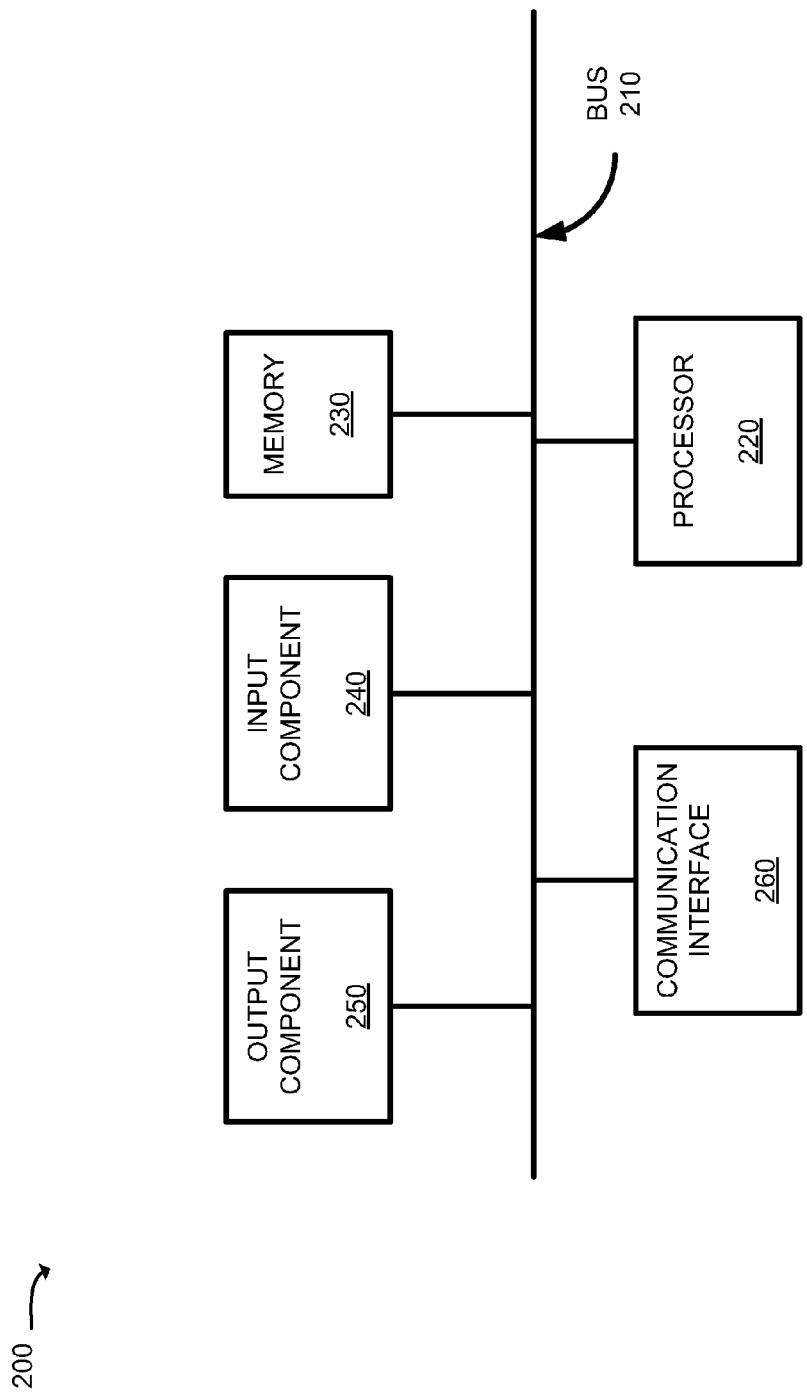
FIG. 2 is a diagram of example components of one or more of the devices of FIG. 1.

FIG. 2 is a diagram of example components of a device 200. Device 200 may correspond to user device 110, optimization device 140, and/or content provider 150. Alternatively, or additionally, each of user device 110, optimization device 140, and/or content provider 150 may include one or more devices 200 and/or one or more portions of devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic (e.g., an ASIC or FPGA) that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 130. In one alternative implementation, communication interface 260 may be a logical component that includes input and output ports, input and output systems, and/or other input and output components that facilitate the transmission of data to other devices.

As described herein, device 200 may perform certain operations relating to dynamically allocating RAN resources based on feedback received from user devices 110. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
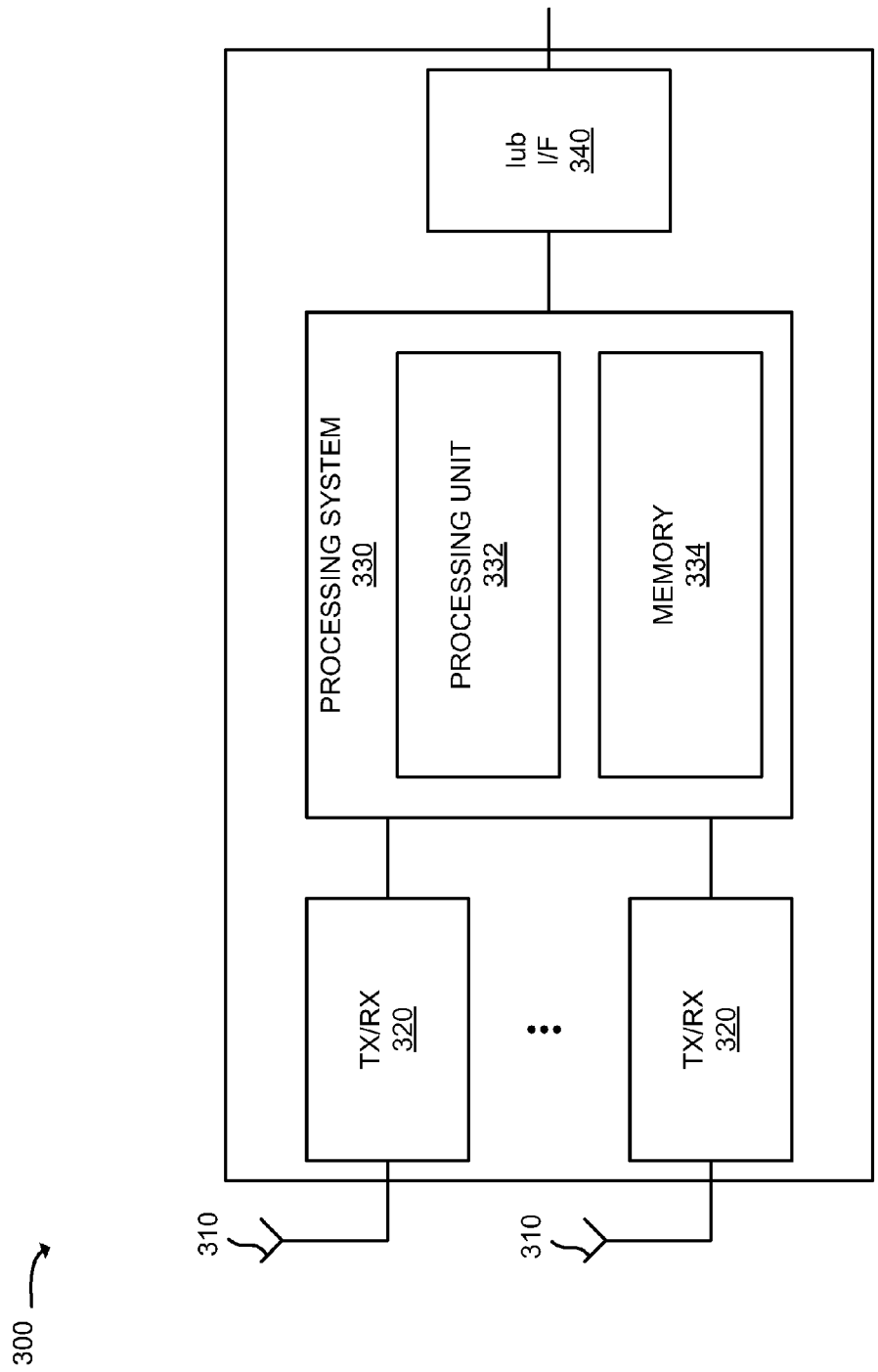
FIG. 3 is a diagram of example components of a base station of FIG. 1.

FIG. 3 is a diagram of example components of device 300 that may correspond to one or more of base stations 120. Alternatively, or additionally, device 300 may include one or more devices 300 and/or one or more portions of devices 300.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

As shown in FIG. 3, device 300 may include antennas 310, transceivers (TX/RX) 320, a processing system 330, and an Iub interface (I/F) 340. Antennas 310 may include one or more directional and/or omni-directional antennas. Transceivers 320 may be associated with antennas 310 and may include transceiver circuitry for transmitting and/or receiving symbol sequences in a network, such as network 100, via antennas 310.

Processing system 330 may control the operation of device 300. Processing system 330 may also process information received via transceivers 320 and Iub interface 340. Processing system 330 may further measure quality and strength of a connection, may determine a frame error rate (FER), and may transmit this information to network 130. As illustrated, processing system 330 may include a processing unit 332 and a memory 334.

Processing unit 332 may include one or more processors, microprocessors, application specific integrated circuits (ASICs), field programmable gate arrays (FPGAs), or the like. Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a random access memory (RAM), a read-only memory (ROM), and/or another type of memory to store data and instructions that may be used by processing unit 332.

Iub interface 340 may include one or more line cards that allow device 300 to transmit data to and receive data from optimization device 140.

As described herein, device 300 may perform certain operations in response to processing unit 332 executing software instructions contained in a computer-readable medium, such as memory 334. A computer-readable medium may be defined as a non-transitory memory device. A memory device may include space within a single physical memory device or spread across multiple physical memory devices. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores configuration information used to optimize delivery of streams. Optimization device 140 may generate data structure 400, as described further below with reference to FIG. 5. In one implementation, optimization device 140 may transmit data structure 400 to a device of an operator of base stations 120. The operator and/or the device may configure one or more base stations 120 based on the configuration information included in data structure 400. In another implementation, optimization device 140 may transmit data structure 400 to one or more base stations 120. The one or more base stations 120 may operate based on the configuration information included in data structure 400. Data structure 400 may be stored in a memory and/or storage device associated with the device of the operator, base station 120, and/or optimization device 140.

As shown in FIG. 4, data structure 400 may include a collection of fields, such as a schedule identifier (ID) field 405, a time field 410, a base station ID field 415, a stream ID field 420, a stream type field 425, a frequency band field 430, and/or a bandwidth field 435. Data structure 400 includes fields 405-435 for explanatory purposes. In practice, data structure 400 may include additional fields, fewer fields, different fields, and/or differently arranged fields than are described with respect to data structure 400.

Schedule ID field 405 may store information that uniquely identifies particular configuration information, that is stored in data structure 400, from other configuration information that was previously stored within other data structures 400. The configuration information may include resource scheduling information. The resource scheduling information identifies a manner in which network resources (e.g., bandwidth of base station 120) have been allocated and/or are to be used by one or more particular base stations 120 to provide optimized delivery of streams.

Time field 410 may store information that identifies a period of time during which the configuration information is in effect and/or is to be used by the particular base stations 120 to provide optimized delivery of streams. Base station ID field 415 may store information that identifies the particular base stations 120 to which the configuration information, identified in schedule ID field 405, corresponds.

Stream ID field 420 may store information that identifies one or more streams that are to be provided, by the particular base stations 120, to user devices 110 served by the particular base stations 120. Stream type field 425 may store information that identifies a type of a corresponding stream identified in stream ID field 420. The type of the stream may specify a manner in which the corresponding stream is to be provided to user devices 110 that are served by the particular base stations 120. The manner may include an amount of delay allowed for the stream. Information stored in bandwidth field 435 may vary based on the manner in which the corresponding stream is to be provided, as described further below.

Frequency band field 430 may store information that identifies a respective frequency band to be used to provision each of the streams. For example, the identified frequency bands may include a PCS band (e.g., 1.85-1.99 gigahertz (GHz)), an AWS band (e.g., 1.71 to 1.755 GHz), an upper 700 MHz band, a lower 700 MHz band, a cellular band (e.g., 850 MHz) and/or some other band (e.g., as identified by one or more 3GPP standards). In one example, base station 120 may use a 700 MHz band to provide video streams to user devices 110 (e.g., user device 110-1) that are outside of service venue areas. In another example, base stations 120 may use an AWS band to provide streams to user devices 110 (e.g., user devices 110-2, 110-3, and 110-4) that are within a service venue area.

Bandwidth field 435 may store information that identifies a respective quantity of bandwidth, a data rate, a quantity of subframes and/or time slots, and/or an MCS index to be used to provide each of the corresponding streams indentified in stream ID field 420, based on the respective frequency bands identified in frequency band field 430. The operator of base stations 120 and/or base station 120 may set parameters of base station 120 based on the information in bandwidth field 435 to optimize delivery of the streams.

Optimization device 140 may, for example, obtain traffic load information from base stations 120. Optimization device 140 may generate configuration information, associated with one or more particular base stations 120 that service user device 110, based on the traffic load information obtained from the particular base stations 120 and/or service information. The service information may include stream information obtained from content providers 150 and/or allocation/division of bandwidth information. The allocation/division of bandwidth information may specify a setting to split bandwidth of base stations 120 between broadcast services provided by content providers 150 and other services (e.g., unicast services) in a particular manner.

The traffic load information may identify a quantity of bandwidth, a data rate, a quantity of subframes and/or time slots, and/or an MCS that is being processed by base station 120. The traffic load information may also, or alternatively, identify a respective quantity of bandwidth, a data rate, a quantity of subframes and/or time slots, and/or an MCS being used, by base station 120, to provision each application and/or service (e.g., broadcast services (e.g., providing different video streams), unicast services (e.g., email, Internet access for other data services), etc.), and/or a capacity associated with base station 120 (e.g., a maximum quantity of bandwidth, data rate, and/or subframes and/or timeslots that can be processed, relative to each carrier band, channel, etc.). The traffic load information may also identify a quantity of applications and/or services being provisioned via base station 120, a type of content being provisioned (e.g., unicast, multicast, broadcast, video, voice, text, etc.) via base station 120, user devices 110 being served by base station 120, etc.

Optimization device 140 may use the traffic load information and/or the service information to allocate processing/bandwidth resources associated with base station 120. For example, as shown in FIG. 4, optimization device 140 may store, within data structure 400, information associated with a live video stream (e.g., LIVEVID$_1$), a first previously recorded video stream (e.g., RECVID1), a second previously recorded video stream (e.g., RECVID2), a data stream that includes statistics (e.g., STATS1), etc. Each one of ellipses 432, 434, 436, and 438 may correspond to a different one of the streams.

For example, configuration information associated with the live video stream may include, as shown in ellipse 432, an identifier associated with the live video stream (e.g., LIVEVID1); a delay-sensitive type (e.g., DS) associated with the live video stream; and a first quantity of bandwidth (e.g., BW1), which is associated with a second frequency band (e.g., BAND2) (e.g., an AWS frequency band) to be used to provide the live video stream to user devices 110 (e.g., user device 110-2) that are within the service venue area. Additionally, or alternatively, ellipse 432 may include a data rate associated with the second frequency band in bandwidth field 435.

Configuration information associated with the first previously recorded video stream may include, as shown in ellipse 434, an identifier associated with the first previously recorded video stream (e.g., RECVID1); a delay-tolerant type (e.g., DT) associated with the first previously recorded video stream; and a second quantity of bandwidth (e.g., BW2), which is associated with a first frequency band (e.g., BAND1) (e.g., a 700 MHz frequency band) to be used to provide the first previously recorded video stream to user devices 110 (e.g., user device 110-1) that are outside of the service venue area.

Configuration information associated with the second previously recorded video stream may include, as shown in ellipse 436, an identifier associated with the second previously recorded video stream (e.g., RECVID2); a delay-tolerant type (e.g., DT) associated with the second previously recorded video stream; and a third quantity of bandwidth (e.g., BW3), which is associated with the second frequency band (e.g., BAND2) to be used to provide the second previously recorded video stream to user devices 110 (e.g., user device 110-2) that are within the service venue area.

Configuration information associated with the statistics stream may include, as shown in ellipse 438, an identifier associated with the statistics stream (e.g., STATS1); a delay-insensitive type (e.g., DI) associated with the statistics stream; and a fourth quantity of bandwidth (e.g., BW4), which is associated with the second frequency band (e.g., BAND2) to be used to provide the statistics stream to user devices 110 (e.g., user device 110-2) that are within the service venue area.

Configuration information associated with the statistics stream may further include a schedule ID (e.g., 123) within schedule ID field 405 of data structure 400; a period of time (e.g., Sep. 8, 2011, 8:00 PM-11:00 PM) within time field 410; and identifiers of one or more base stations 120 (e.g., an identifier of base station 120-1) within base station ID field 415.

In other implementations, optimization server 140 may store, within data structure 400, information associated with other types of services (e.g., unicast services, VoLTE services, etc.) and/or indications that the streams and/or the other types of services are to be provisioned as unicast content and/or multicast/broadcast content. Optimization server 140 may further store configuration information that indicates that the other types of services are to be provisioned using a quantity of subframes and/or time slots associated with a frequency band (e.g., BAND 3) and/or a MCS index associated with one or more frequency bands.

Figure 5:
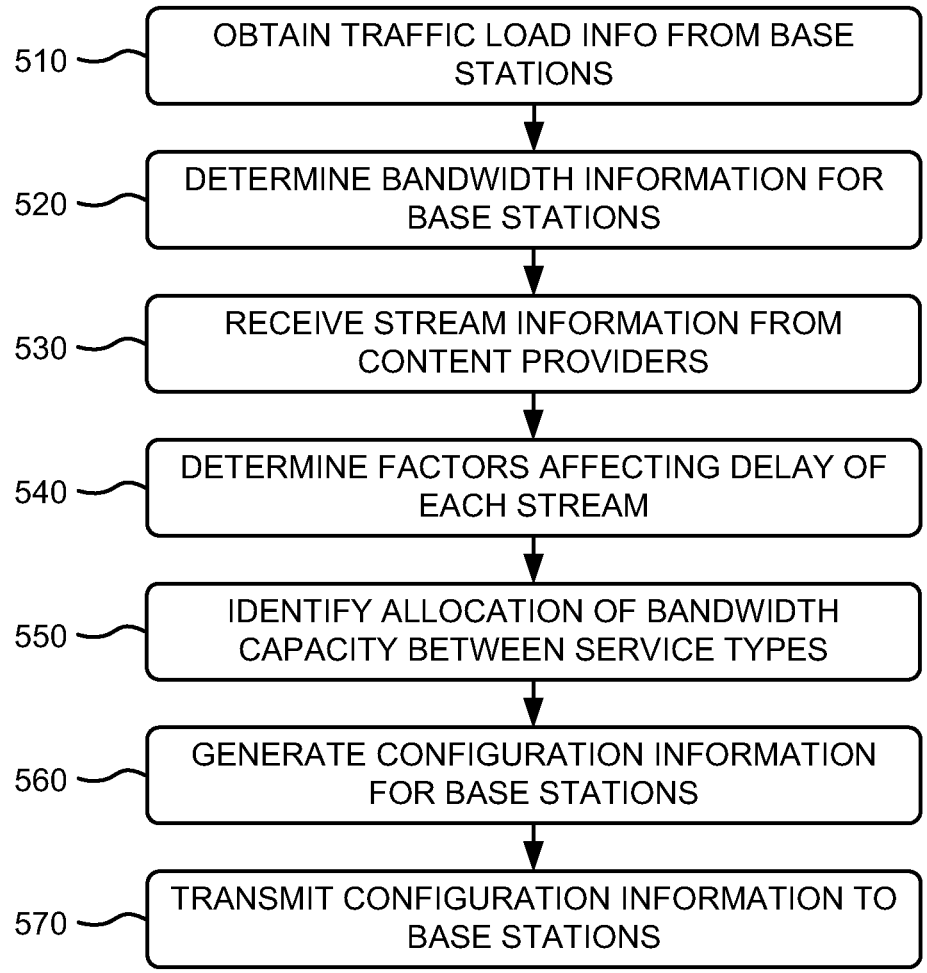
FIG. 5 is a flow chart of an example process for optimizing delivery of streams.

FIG. 5 is a flow chart of an example process 500 for optimizing delivery of streams. In one implementation, optimization device 140 may perform process 500. In another implementation, some or all of process 500 may be performed by a device or collection of devices separate from, or in combination with optimization device 140.

As shown in FIG. 5, process 500 may include obtaining traffic load information from base stations (block 510). For example, each base station 120 may include a scheduler that gathers traffic load information. Optimization device 140 may determine that traffic load information is to be obtained from one or more base stations 120 associated with a RAN. Optimization device 140 may obtain the traffic load information based on a predetermined time (e.g., a particular time of the day, etc.), a time interval (e.g., every thirty minutes, one hour, two hours, six hours, etc.), as a result of an occurrence of some event (e.g., an indication that base station 120 is congested), etc. Based on the determination that the traffic load information is to be obtained, optimization device 140 may transmit an instruction, to base stations 120, to send traffic load information to optimization device 140. Base stations 120 may receive the instruction and may transmit, to optimization device 140, the traffic load information. Optimization device 140 may receive the traffic load information from base stations 120.

Process 500 may further include determining bandwidth information for the base stations (block 520). For example, the traffic load information may identify applications and/or services that are being provisioned via base stations 120. Optimization device 140 may use the traffic load information to determine bandwidth information associated with base stations 120. The bandwidth information may include a respective frequency band, a respective quantity of bandwidth, a respective data rate, a respective quantity of subframes and/or time slots, and/or a respective MCS index, used by base station 120, to provision each application and/or service. The bandwidth information may further include a quantity of bandwidth, a data rate, a quantity of subframes and/or time slots, and/or MCS index being processed by base station 120 relative to each frequency band.

Process 500 may also include receiving stream information from content providers (block 530). For example, one or more content providers 150 may plan to provide streams to user devices 110 via base stations 120. Content providers 150 may provide stream information about the streams to optimization device 140. The stream information, for each one of the streams, may include, for example, one or more of an identifier associated with a stream, content information associated with a stream (e.g., live content, recorded content, statistics, etc.), a type of the stream (e.g., a delay-sensitive stream, a delay tolerant stream, a delay-insensitive stream), a delay requirement associated with the stream (e.g., less than 1 second, less than 2 seconds, less than 10 seconds, etc.), a level of quality required for the stream, a data rate associated with the stream (e.g., 300 Kbps, 500 Kbps, 1 Mbps, etc.), and/or other information associated with the streams. Optimization device 140 may receive the stream information.

Process 500 may also include determining factors affecting delay of each stream (block 540). For example, optimization device 140 may determine factors affecting delay of each stream based on the bandwidth information. In one implementation, the bandwidth information may include data for one or more of the factors. In another implementation, optimization device 140 may determine the data used to determine factors affecting delay of the stream based on other information included in the bandwidth information. The factors affecting delay of the stream may include, for example, base station configurations (e.g., eNB radio configurations (RC) required for the stream, a streaming format used for the stream, an amount of forward error correction (FEC) overhead in the stream, a type of encoding used for the stream, a type of location where content is injected for the stream, the data rate associated with the stream, whether transcoding is required, and/or congestion delay in the LTE network (e.g., that includes base stations 120).

The base station configurations may be required and/or requested by a particular content provider 150 that is providing the stream. The base station configurations may include, for example, particular selected subframes, a quantity of the subframes, an MCS index, etc. to be used by base station 120 to provide the stream to user devices 110 serviced by base station 120.

The streaming format may specify, for example, a Hypertext Transfer Protocol (HTTP) segmentation size used to provide the stream. The HTTP segmentation size may equal a particular quantity of seconds, such as 1 second, 5 seconds, 10 seconds, etc. The delay affecting the stream may vary based on the particular quantity of the seconds of the HTTP segmentation size. For example, the delay affecting the stream may increase when a particular quantity of seconds, associated with the streaming format, increases.

The amount of FEC overhead may specify a percentage of overhead that is to be added to packets of the stream to protect the data in the stream. For example, the amount of FEC overhead may equal 0%, 5%, 10%, 15%, etc. Each one of the particular percentages of FEC overhead may correspond to a particular amount of delay. For example, the delay affecting the stream may increase when a particular percentage of FEC overhead increases.

The type of encoding used for the stream may identify encoding associated with the stream. In one example, the type of encoding may specify that real-time encoding needs to be performed before the stream is transmitted to user devices 110, which imposes an additional delay. In another example, the type of encoding may specify that the data of the stream was previously encoded, which does not impose an additional delay.

The type of location where content is injected for the stream may specify a geographic area associated with where the content originates. The type of location may specify that the content is injected, for example, locally (e.g., in the service venue area), regionally, or nationwide. For example, the delay may be less when content is injected locally than when the content is injected nationwide.

In one implementation, as discussed above, the bandwidth information may include the data rate associated with the stream. In other implementations, optimization device 140 may determine the data rate based on the level of quality required for the stream. A higher data rate (e.g., 800 Kbps) may be required for a higher level of quality. For example, a higher data rate, required by a higher level of quality associated with the stream, may increase the delay associated with the stream.

Transcoding may be required when video content is available in one format and is to be provided, to user devices 110, in a different format. In some implementations, optimization device 140 may determine whether transcoding is required for the stream based on the type of the stream. For example, transcoding may be required for the stream when the stream includes live video content. Transcoding may impose an additional delay.

The congestion delay in the LTE network may specify whether one or more base stations 120, associated with the LTE network, are congested and/or have reached capacity. Optimization device 140 may determine whether congestion is present, in base stations 120 of the LTE network, based on the bandwidth information and/or the traffic load information. For example, optimization device 140 may determine that a quantity of bandwidth, data rate and/or a quantity of subframes and/or time slots, that is being used to provision an application and/or service, is greater than a maximum threshold associated with a frequency band (e.g., used to provide the stream to user devices 110). Based on the determination that the quantity of bandwidth, data rate, and/or quantity of subframes and/or time slots is greater than the maximum threshold, optimization device 140 may determine that the frequency band, used to provision the application and/or service, has reached capacity. In one example, as a result of the congestion delay of the frequency band used to provide the (e.g., video) stream, data rates may not be guaranteed and latency and jitter may increase. As a result, the delay for the stream may increase.

Returning to FIG. 5, process 500 may also include identifying allocation of bandwidth capacity between service types (block 550). For example, base stations 120 may provide bandwidth capacity of frequency bands for broadcasting services (e.g., eMBMS and/or unicast services). The broadcasting services may include providing streams (e.g., video content, statistics, etc.) from content providers 150 to user device 110. The unicast services may include email services, Internet access services, other data services, etc. In one implementation, optimization device 140 may store and/or have access to information that specifies an allocation of bandwidth capacity between broadcast services and unicast services. In yet another implementation, optimization device may receive the information from the device of the operator of base stations 120. The information may specify, for example, that 40% of the bandwidth capacity is to be allocated to broadcasting services and 60% of the bandwidth capacity is to be allocated to unicast services. Optimization device 140 may identify the allocation/division of the bandwidth capacity, between the broadcast services and the unicast services, based on the information.

Process 500 may also include generating configuration information for base stations (block 560). For example, optimization device 140 may generate configuration information based on the bandwidth information, the stream information, the factors affecting the delay of the streams, and/or the allocation/division of the bandwidth capacity, between eMBMS and unicast services or between broadcasting services, unicast services, and/or multicast services. In one example, the configuration information may specify parameters for base stations 120 for transmission of different streams during a particular period of time. In another example, the configuration information may assign resources (e.g., bandwidth, data rates, subframes and/or time slots, MCS indices, carrier frequencies, processing capacity, etc.) of base station 120 for each one of the streams. Different amounts of resources are assigned, to different streams, in order to comply with the different delay requirements corresponding to the streams, optimize use of the resources, and/or share the resources between eMBMS and unicast services or between the broadcasting services, the unicast services, and/or the multicast services.

Process 500 may also include transmitting the configuration information to the base stations (block 570). In one implementation, optimization device 140 may transmit a data structure (e.g., data structure 400 of FIG. 4) that represents/ includes the configuration information to one or more base stations 120. In another implementation, optimization device 140 may store respective resource schedule information (e.g., portions of the configuration information), for each base station 120, in a different data structure (e.g., data structure 400). Optimization device 140 may transmit respective resource schedule information, to each base station 120. A particular base station 120 may use the configuration information, and/or the resource schedule information, to transmit the streams by using different (e.g., amounts of) resources, of the particular base station 120, during the particular period of time—in order to comply with the different delay requirements that correspond to the streams.

In yet another implementation, optimization device 140 may transmit the configuration information to the device of the operator of base stations 120. The device and/or the operator may set parameters of one or more base stations 120 based on the configuration information. The parameters may instruct the one or more base stations 120 to transmit the streams by using different (e.g., amounts of) resources during the particular period of time in order to comply with the different delay requirements that correspond to the streams.

In still yet other implementations, optimization device 140 may provide the configuration information only for periods of time when high stream traffic is expected (e.g., only for periods of time corresponding to Sunday afternoons or Monday nights when popular live sporting events are expected). Furthermore, optimization device 140 may not operate in real-time, and may provide the configuration information ahead of the periods of time when high stream traffic is expected (e.g., 48 hours before the popular live sporting event). Base stations 120 may operate based on the configuration information until a triggering event occurs (e.g., the popular live sporting event ends).

Systems and/or methods, described herein, may enable an optimization device to obtain information about available resources of base stations and about streams of content with different delay requirements. The optimization device may generate configuration information that specifies how the available resources should be used by the base stations, to provide each one of the streams to user devices, in order to comply with the different delay requirements. Implementations, described herein, allow the base stations (e.g., within the LTE network) to meet the delay requirements of the streams, achieve optimum bandwidth efficiency for using resources of the base stations, and/or share the resources between broadcasting services and unicast services in an optimized manner. In other implementations, the resources may be shared between eMBMS and unicast services in an optimized manner The foregoing description of implementations provides illustration and description, but is not intended to be exhaustive or to limit the possible implementations to the precise form disclosed. Modifications and variations are possible in light of the above teachings or may be acquired from practice.

For example, while a series of blocks have been described with regards to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the system implementations may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 receiving, by a computing device, first information about a first stream of content,
  where the first information comprises a first delay requirement for the first stream of content;
 receiving, by the computing device, second information about a second stream of content,
  where the second information comprises a second delay requirement for the second stream of content, and
  where the second delay requirement is different from the first delay requirement;
 determining, by the computing device, bandwidth information about bandwidth resources of a base station;
 generating, by the computing device, configuration information, for the base station, based on the first information, the second information, and the bandwidth information,
  where the configuration information identifies how the bandwidth resources are to be used by the base station, while forwarding the first stream of content and the second stream of content, to comply with the first delay requirement and the second delay requirement; and transmitting, by the computing device, the configuration information to the base station or to a device that configures the base station.

2. The method of claim 1,
where the first stream of content comprises live video content, and
where the second stream of content comprises content that is not live content.

3. The method of claim 1,
where the first delay requirement allows the first stream of content to be transmitted with less than a first particular amount of delay,
where the second delay requirement allows the second stream of content to be transmitted with less than a second particular amount of delay, and
where the first particular amount is less than the second particular amount.

4. The method of claim 1, where the first information further comprises one or more of:
a type of content in the first stream of content,
a level of quality required for the first stream of content,
a data rate associated with the first stream of content,
a type of encoding used for the first stream of content,
a streaming format used for the first stream of content, or
an amount of forward error correction (FEC) overhead in the first stream of content.

5. The method of claim 1,
where determining the bandwidth information about the bandwidth resources comprises:
transmitting, to the base station, an instruction to send traffic load information,
receiving the traffic load information from the base station in response to transmitting the instruction, and
determining the bandwidth information based on the traffic load information.

6. The method of claim 1,
where generating the configuration information comprises:
identifying an allocation of the bandwidth resources between evolved multimedia broadcast multicast services (eMBMS) and unicast services, and
generating the configuration information further based on the allocation of the bandwidth resources, and
where the eMBMS comprise providing the first stream of content and the second stream of content to user devices.

7. The method of claim 1, where the configuration information comprises one or more of:
a frequency band to be used for the first stream of content,
a quantity of bandwidth to be used for the first stream of content,
a data rate to be used for the first stream of content,
a quantity of sub frames or time slots to be used for the first stream of content, or
a modulation and coding scheme (MCS) index to be used for the first stream of content.

8. The method of claim 1,
where the first stream of content comprises live video content of a live event, and
where the configuration information is valid for only a period of time during the live event.

9. The method of claim 8, where transmitting the configuration comprises:

transmitting the configuration information to the base station a particular amount of time before the live event begins.

10. A device comprising:
a memory to store instructions; and
a processor to execute one or more of the instructions to cause the processor to:
receive, from one or more base stations, first information about bandwidth resources of the one or more base stations,
receive, from one or more content providers, second information about streams of content to be provided by the one or more content providers to user devices via the one or more base stations, wherein the first information comprises:
a first delay requirement associated with first ones of the streams of content, and
a second delay requirement associated with second ones of the streams of content,
generate third information based on the first information and the second information, wherein the third information assigns a first portion of the bandwidth resources for providing each one of the first streams of content in accordance with the first delay requirement and a second portion of the bandwidth resources for providing each one of the second streams of content in accordance with the second delay requirement, and
transmit the third information to configure the one or more base stations.

11. The device of claim 10, where the one or more base stations comprise evolved Node Bs (eNBs), of a long term evolution (LTE) network, that forward the streams of content from the one or more content providers to the user devices based on the third information.

12. The device of claim 10,
wherein the first delay requirement is more stringent than the second delay requirement.

13. The device of claim 10,
wherein, when generating the third information, the processor is further to execute the instructions to cause the processor to:
identify a division of the bandwidth resources between a first type of services and a second type of services, and
generate the third information further based on the division of the bandwidth resources, and
wherein the first type of services comprise the providing of at least one of the first and second streams of content to the user devices.

14. The device of claim 13,
wherein the first type of services comprise one or more of:
a first service that provides live video content,
a second service that provides previously recorded video content, or
a third service that provides information associated with the live video content,
wherein the second type of services comprise one or more of:
a Voice over LTE (VoLTE) service,
an email service, or
a best effort data service, and
wherein the division comprises:
a first particular percentage of the bandwidth resources reserved for the first type of services, and
a second particular percentage of the bandwidth resources reserved for the second type of services.

15. The device of claim 10, wherein, when generating the third information, the processor is further to execute the instructions to cause the processor to:
  determine factors affecting delay of each one of the first and second streams of content based on the first information, and
  generate the third information further based on the factors affecting delay of each one of the first and second streams of content.

16. The device of claim 15, wherein the processor is further to execute the instructions to cause the processor to:
  identify the factors affecting the delay of a particular stream, of the first and second streams of content, wherein the factors comprise one or more of:
    one or more base station configurations required for the particular stream,
    a streaming format used for the particular stream,
    an amount of forward error correction (FEC) overhead in the particular stream,
    a type of encoding used for the particular stream,
    a type of location where content is injected for the particular stream, or
    a data rate associated with the particular stream.

17. One or more non-transitory computer-readable media comprising:
  instructions, which when executed by one or more processors of a computing device, cause the one or more processors to perform a method comprising:
    receiving, from a first device, first information about a first stream of live video content,
      wherein the first information comprises a first delay requirement for the first stream;
    receiving, from the first device or a second device, second information about a second stream of non-live video content,
      wherein the second information comprises a second delay requirement for the second stream, and
      wherein the second delay requirement is less stringent than the first delay requirement;
    assigning a first amount of resources, of a base station, for the first stream based on the first delay requirement;
    assigning a second amount of resources, of the base station, for the second stream based on the second delay requirement; and
    transmitting resource information to configure the base station for transmitting the first stream and the second stream,
      wherein the resource information specifies the first amount of resources and the second amount of resources.

18. The media of claim 17,
the method further comprising:
  transmitting, to the base station, an instruction to send information about bandwidth resources of the base station, and
  receiving, from the base station, the information about the bandwidth resources in response to the instruction,
wherein assigning the first amount of resources is further based on the information about the bandwidth resources,
wherein assigning the second amount of resources is further based on the information about the bandwidth resources, and
wherein the first amount of resources and the second of amount of resources are further based on the information about the bandwidth resources.

19. The media of claim 17,
the method further comprising:
  receiving information identifying a division of bandwidth resources of the base station between broadcasting services and unicast services,
wherein the broadcasting services comprise providing the first stream and the second stream to user devices, and
wherein the first amount of resources and the second of amount of resources are further based on the division of the bandwidth resources.

20. The media of claim 17,
where transmitting the resource information to configure the base station comprises one of:
  transmitting the resource information to the base station, or
  transmitting the resource information to a device of an operator of the base station,
where, when the resource information is transmitted to the base station, the resource information allows the base station to use the first amount of resources to transmit the first stream and to use the second amount of resources to transmit the second stream, and
where, when the resource information is transmitted to the device of the operator, the resource information allows the device of the operator to use the resource information to configure parameters of the base station in order to comply with the first delay requirement and the second delay requirement.

* * * * *